(12) United States Patent
Oppedisano et al.

(10) Patent No.: US 7,169,039 B2
(45) Date of Patent: Jan. 30, 2007

(54) POSITIVE AIR FLOW SHUTDOWN SYSTEM (75) Inventors: Kenneth J. Oppedisano, 30 Carriage Dr., Easton, CT (US) 06612; William Jacabacci, Shelton, CT (US)

(73) Assignee: Kenneth J. Oppedisano, Easton, CT (US)

(*) Notice: Subject to any disclaimer, the term of this patent is extended or adjusted under 35 U.S.C. 154(b) by 0 days.

(21) Appl. No.: 10/282,148

(22) Filed: Oct. 28, 2002

(65) Prior Publication Data

US 2003/0109963 A1    Jun. 12, 2003

Related U.S. Application Data

(60) Provisional application No. 60/343,855, filed on Oct. 26, 2001.

(51) Int. Cl.
*F24F 13/10* (2006.01)

(52) U.S. Cl. .................. 454/256; 454/333; 454/239

(58) Field of Classification Search ........... 454/239, 454/256, 257, 258, 902, 333; 251/129.11, 251/177
See application file for complete search history.

(56) References Cited

U.S. PATENT DOCUMENTS

| | | | |
|---|---|---|---|
| 3,326,514 A * | 6/1967 | Riley | 251/87 |
| 3,346,013 A * | 10/1967 | Reichow | 137/628 |
| 3,990,464 A | 11/1976 | Jenkins | 137/1 |
| 4,397,223 A | 8/1983 | Maxson | |
| 4,412,477 A | 11/1983 | Bergdahl | |
| 4,662,269 A | 5/1987 | Tartaglino | |
| 4,821,771 A * | 4/1989 | Maxwell | 137/625.44 |
| 4,928,583 A | 5/1990 | Taylor et al. | |
| 5,029,810 A * | 7/1991 | Finnerty | 251/299 |
| 5,462,485 A | 10/1995 | Kinkead | 454/256 |
| 6,213,142 B1 * | 4/2001 | Engdahl | 137/38 |
| 6,217,441 B1 | 4/2001 | Pearman et al. | 454/333 |
| 6,293,861 B1 * | 9/2001 | Berry | 454/255 |
| 6,428,680 B1 * | 8/2002 | Kreichauf | 205/628 |
| 6,583,726 B1 * | 6/2003 | Johnson et al. | 340/627 |

FOREIGN PATENT DOCUMENTS

JP        61049947 A *  3/1986

* cited by examiner

*Primary Examiner*—Gregory Wilson
(74) *Attorney, Agent, or Firm*—Geza Ziegler, Jr.; Perman & Green, LLP.

(57) ABSTRACT

An airflow shutdown system that includes an air distribution system and an air duct closure device. The air duct closure device is adapted to substantially instantaneously block airflow in the air distribution system when activated. The system also includes an integrated control system coupled to the air distribution system and adapted to activate the air duct closure device and stop an operation of other air distribution devices in the air distribution system in order to prevent migration of air through the system.

33 Claims, 10 Drawing Sheets

POSITIVE AIR FLOW SHUTDOWN SYSTEM

CROSS-REFERENCE TO RELATED APPLICATIONS

This application claims priority from U.S. Provisional Patent Application No. 60/343,855 filed on Oct. 26, 2001.

BACKGROUND OF THE INVENTION

1. Field of the Invention

The present invention generally relates to the control of airflow in an air facility distribution system, and in particular to shutting down the movement of air in a facility air management system.

2. Brief Description of Related Developments

Facility air management systems, such as those for heating, ventilation and air conditioning ("HVAC") systems, generally provide an efficient way to distribute air throughout a building or facility very quickly.

Existing building air systems are vulnerable to chemical and biological acts of terrorism due to the ease with which such agents can be introduced and then distributed throughout the air distribution system and then the facility.

A destructive way to carry out a chemical and biological act of terrorism is through building air systems whether intentional or accidental. HVAC systems are one of the most vulnerable areas in which the security and safety of people can be breached, especially by using chemical and biological agents.

SUMMARY OF THE INVENTION

The present invention is directed to an air duct closure device. In one embodiment the air duct closure device comprises an air damper including an inlet and an outlet. The air damper is adapted to be connected inline in a respective portion of a duct in an air duct system. The air duct closure device also includes a sealing device in the damper, the sealing device being adapted to seal off, when in a closed position the damper from air flowing through the damper. In another aspect, the present invention is directed to an airflow shutdown system. In one embodiment the airflow shutdown system comprises an air distribution system and at least one air duct closure device in the system. The air duct closure device is adapted to substantially instantaneously block airflow in the air distribution system when activated. The system also includes an integrated control system coupled to the air distribution system and adapted to activate the air duct closure device in order to close the device and stop an operation of other air distribution devices in the air distribution system in order to prevent migration of air through the system.

In a further aspect, the present invention is directed to a method for providing a positive shutdown of airflow in an air distribution system. In one embodiment the method comprises detecting a contaminant in the system, activating at least one duct closure device located upstream and downstream from a location of the detected contaminant, the at least one duct closure device adapted to substantially instantaneously seal a respective airflow passage from further airflow. The method also includes disabling all airflow control devices to stop further migration of airflow in the system and activating an alarm system, to notify occupants of a facility served by the air distribution system of the activation of the at least one sealing device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
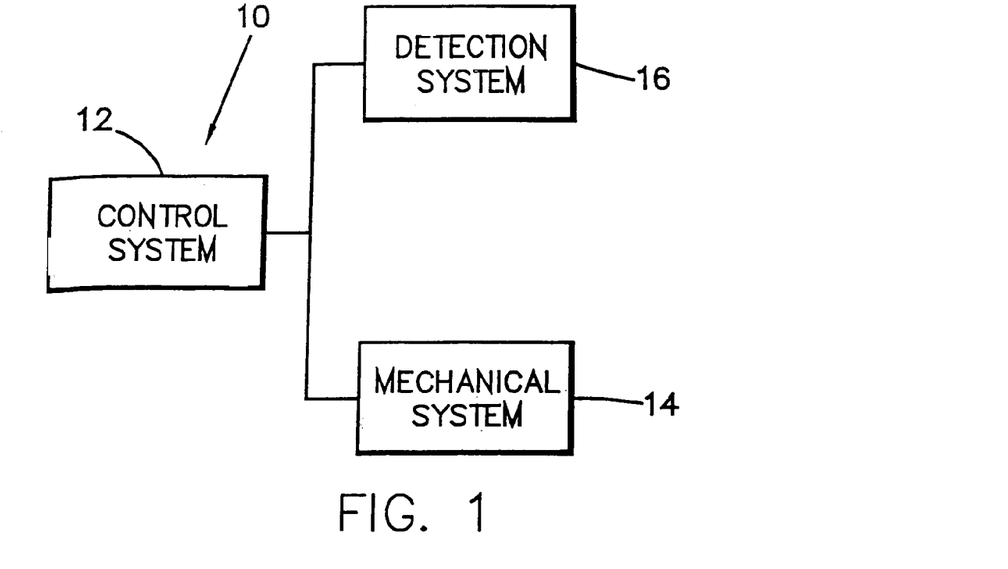
FIG. 1 is a block diagram of one embodiment of a system incorporating features of the present invention.

Referring to FIG. 1, a block diagram is shown of a system 10 incorporating features of the present invention. Although the present invention will be described with reference to the embodiment shown in the drawings, it should be understood that the present invention can be embodied in many alternate forms of embodiments. In addition, any suitable size, shape or type of elements or materials could be used.

Referring to FIG. 1, a facility air distribution system 10 incorporating features of the present invention generally comprises three main components, a control system 12, a mechanical system and a detection or activation system 16. Although a separate detection/activation system is shown, in alternate embodiments the activation system could be integral to the control system 12. The control system 12 generally comprises the main logic to receive detection or activation signals from the detection system 16 and control the activation of the mechanical system 14, as well as other emergency systems and personnel. The mechanical system 14 generally includes at least one instantaneous positive air shutdown ("IPASD") device as well as other aspects of an HVAC system that can be used to stop and/or minimize the flow of air through the system 10. The detection system 16 generally comprises detection means suitable to detect a threat to the HVAC system 10. A threat can include any attempt or suspected attempt to introduce a foreign agent or other contaminant into an HVAC system 10. This can include an attempt or deliberate invasion into the HVAC system 10, or even the detection of an agent that could be drawn into the HVAC system 10. The detection system 16 could include manual or automatic security measures, air sampling and testing devices as well as other devices and means for detecting a threat of, or the presence of, a contaminant in the system. In alternate embodiments the detection system 16 could even include means to detect biological or chemical agents. In one embodiment the system 10 could include security devices that monitor areas or aspects of the system 10 for any type of physical intrusion.

For example, security cameras or alarms could be used to monitor air intake areas. The detection or indication of an intrusion could be used as the basis, whether manual or automatic, to provide an alarm indication and activate the air shut down device.

Figure 2:
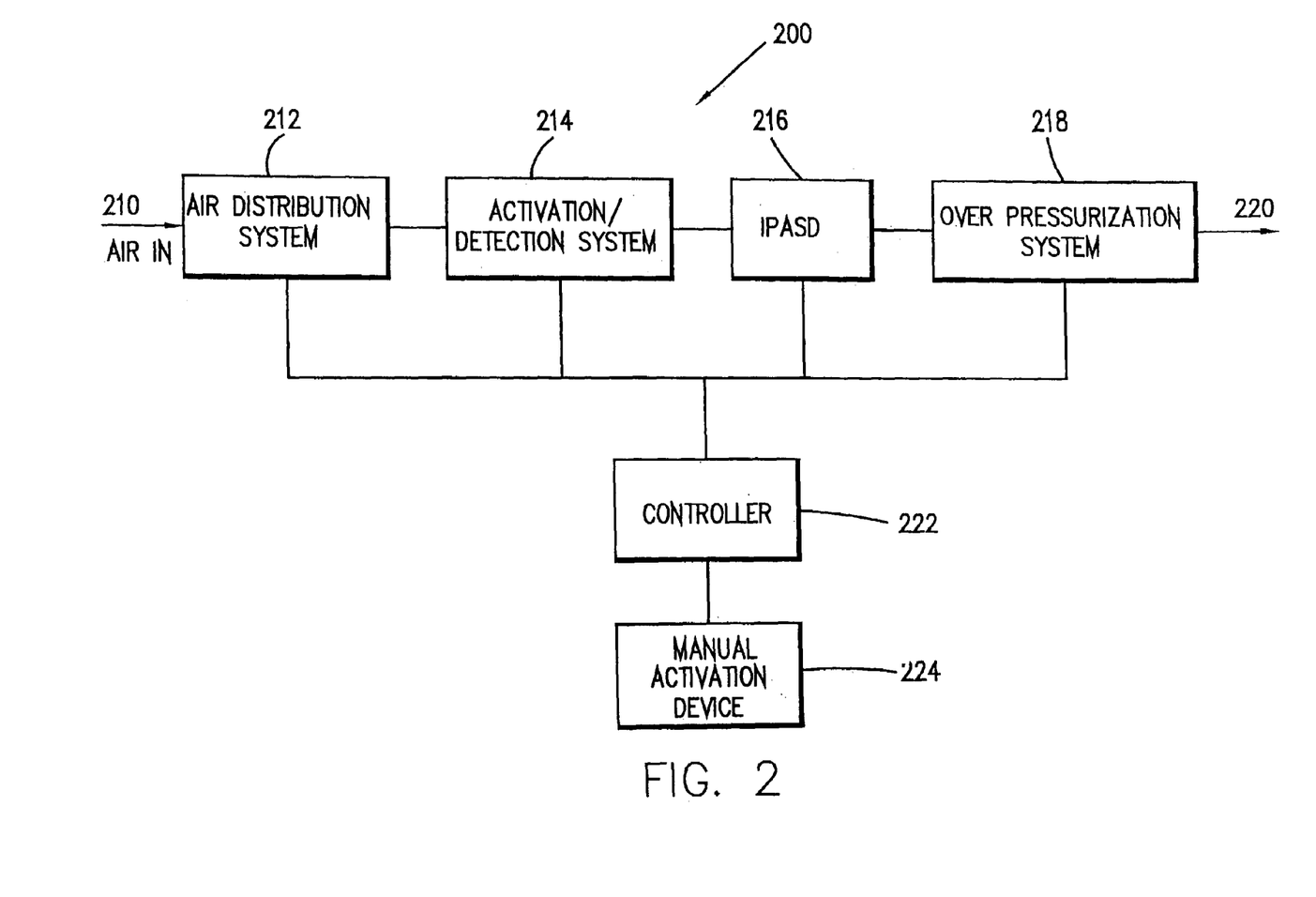
FIG. 2 is a schematic diagram of a facility air distribution system incorporating features of the present invention.
Figure 2A:
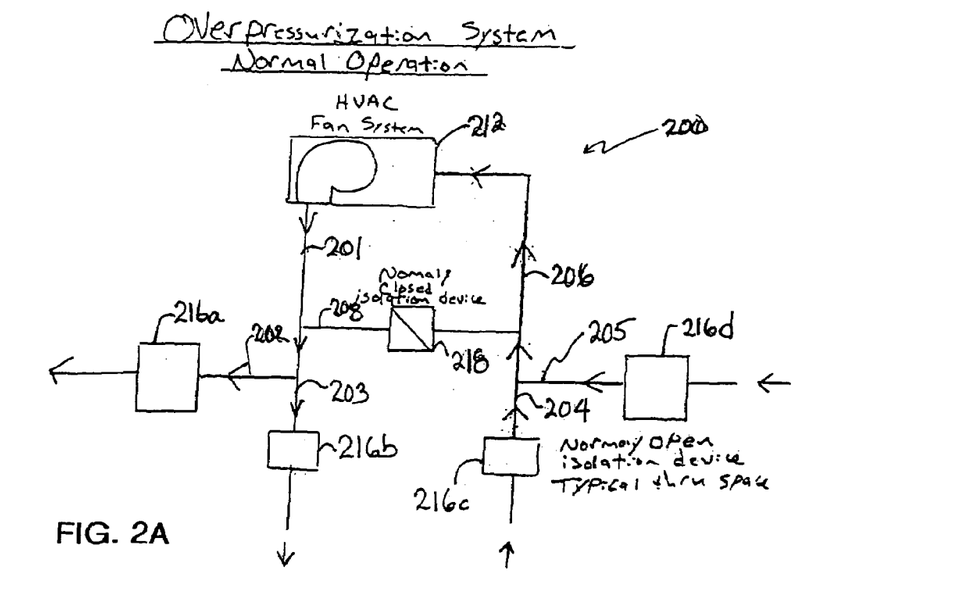
FIG. 2A is a schematic diagram of the overpressurization system of the present invention during normal operation.
Figure 2B:
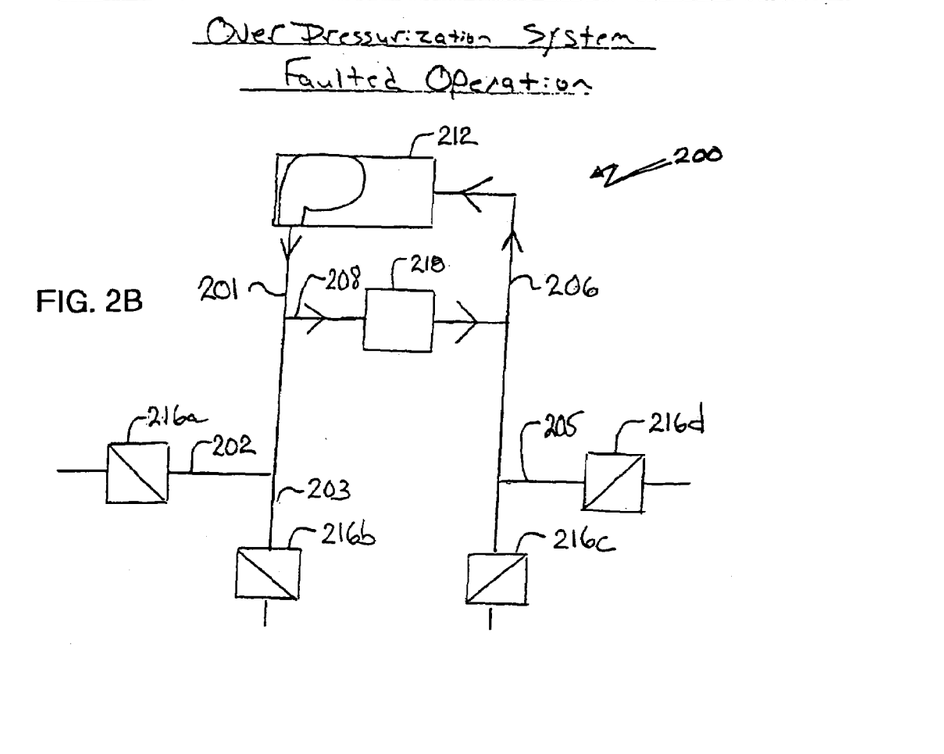
FIG. 2B is a schematic diagram of the overpressurization system of the present invention during faulted operation.

FIG. 2 illustrates a facility air distribution system 200 incorporating features of the present invention. In one embodiment the system 200 generally includes an air distribution system or device 212. In one embodiment, the air distribution system or device 212 can comprise a central HVAC system 212 that is adapted to provide conditioned air and ventilation to and throughout the system 200. In alternate embodiments the air distribution system or device 212 can comprise any suitable device for moving and distributing air through a facility, such as for example, a fan. Referring to FIGS. 2, 2A and 2B, the air distribution 212 is connected or coupled to at least one duct 201, or a network of ducts 201–208, to deliver and distribute the conditioned air to various desired points or areas within the system 200. These distribution points typically include rooms or other areas within a building or facility. Although the term "conditioned air" is used herein, it will be understood that the present invention can be implemented into any system or facility that delivers air or provides ventilation to or within a building or facility. The building or facility referred to herein can also include a house or underground facility, or even a transportation vehicle. Generally, any building, vehicle or system that uses an air delivery source or ventilation system, such as a duct or pipe, is within the scope of the present invention.

Referring to FIG. 2, the system 200 also includes an activation/detection system 214 and an instantaneous positive air shutdown device ("IPASD") 216. A controller 222 is coupled to each of the various components and devices within the system 200.

As shown in FIG. 2, an air supply 210 provides a source of air to the air distribution device 212. In one embodiment, as the air enters the air distribution system 212 the air can be tested or sampled for any contaminants via the detector 214. The activation/detection system 214 is generally adapted to provide for initiating an activation signal to activate the IPASD 216. This can include a manual input or an automatic input. For example, if a security breach is detected in an area of the system 200 that is susceptible to the introduction of a contaminant or foreign agent, an alarm can be activated as well as the IPASD 216. In one embodiment a manual station can be used while in another, an automatic security system can be used to activate the IPASD 216. In alternate embodiments, any suitable system or device can be used to provide an activation signal.

In one embodiment, the activation system/detector 214 can comprise any suitable device that can identify a presence of a chemical or biological agent. The detector 214 can comprise a single detector or multiple detectors and can be located at any suitable point(s) within the system 200 to be able to detect the foreign agent before it can pass from or through the duct work into a populated area. The detector 214 can also include at least one air sampling unit. The air sampling unit is generally adapted to detect a presence of a contaminant, such as for example, a chemical or biological agent in the air distribution system. The air sampling unit can be adapted to detect even minute traces of a contaminant.

Referring to FIGS. 2, 2A and 2b, each IPASD 216a–216d is generally adapted to substantially instantaneously stop the flow of air through a duct or air delivery mechanism within the system 200. The IPASD can also be referred to as a duct closure device. Upon the occurrence of an "event", in one embodiment a signal is delivered to the IPASD 216a–216d to activate a closure or shutdown of the air passage. The "activation" could also include the removal of a signal, or power, that then causes one or more of the IPASD 216a–216d to close. For example, it might be beneficial to have the IPASD 216a–216d automatically close in the event of a power interruption or loss. Generally, the IPASD 216a–216d is connected or coupled in-line with a duct, such as ducts 201–208. Thus, upon activation or closure of the IPASD 216a–216d, air movement through the respective duct 201–208 will be stopped. As shown in FIG. 2, the system 200 can also include an over pressurization system 218. Referring to FIGS. 2A and 2B, when an air movement or distribution device or fan 212 is depowered, the fan still has momentum and air may continue to be moved. In order to prevent damage to the ducts 210–208 and system, the over pressurization device or system 218 is adapted to absorb the "shock", on the air still moving in the system. The system 218 can include for example pressure relief ducts or diverts that allow the bypass of air from the negative to the positive side. The system 218 absorbs the shock when the IPASD 216a–216d closes down the ducts 201–208.

Although only one activation/detector 214 and IPASD 216 are shown in FIG. 2, the system 200 could include any number of such devices. For example, one IPASD 216 could be used to control a central artery leading to a network of individual lines or ducts. In alternate embodiments, such as shown in FIGS. 2A and 2B, a single IPASD 216a–216d could be included in each air supply line 210–208 within the system 200. It is a feature of the present invention to stop the flow of air throughout the system to prevent the spread of the foreign agent. Thus, any suitable number of detectors 214 and IPASD 216 devices can be used.

Each IPASD device 216 is generally adapted to relatively instantaneously block off or close a corresponding air or ventilation duct. The term "instantaneously" is generally used herein to refer to a very short period of time. This time period can sometimes be on the order of milliseconds, although a longer time period can also be implied. When an IPASD 216 is activated, a closure mechanism or device is used to block off as much of the corresponding duct(s) or opening(s) as possible in the shortest amount of time that is possible. Generally, the stoppage of airflow is accomplished by the consumption or closure of an air duct opening. It will be understood by those of skill in the art that an air duct opening can comprise any suitable shape or size. The IPASD 216 can be adapted to accommodate any shape or size air duct or opening. The IPASD 216 generally includes a closure device that upon activation will create a positive barrier in a duct and stop all air movement or migration in the air distribution system associated with the particular duct or ducts. For example, the closure device could comprise a spring-loaded air tight (failed shut) damper. In alternate embodiments, the closure device could comprise any electronic, pneumatic, mechanical, hydraulic or manual device, or combination thereof adapted to substantially instantly cut off air movement in an air duct system.

Similarly, the effectiveness of the "closure" of the ventilation path can depend upon the ability of the closure device to conform to the shape of the ventilation path. The ability to conform can correlate to the ability to block or seal the duct or path from further air movement. In the preferred embodiment, activation of the IPASD device 216 will cause the substantially "instantaneous and complete" closure of a ventilation path or duct. However, in alternate embodiments, different time intervals for closure may be used and different levels of blockage or closure of the ventilation path or duct may be implemented.

The IPASD devices 216 or units can, be located at any suitable point or position in the air distribution system. For example, referring to FIGS. 5a and 5b, an IPASD device 540 could be located at the fresh air intake louver 516 of the HVAC system in order to halt the introduction of harmful chemical and or biological agents into the system from outside the facility. An IPASD device 540 could also be located at the output side of an air supply duct in order to halt the distribution of harmful chemical and or biological agents from infiltrating other areas of the facility.

With all necessary IPASD units installed properly and precisely located, any harmful chemical and or biological agents will be either blocked from entering the facility or, at the very least, isolated to a specific area of the building.

Referring to FIG. 2, in an embodiment where the activation/detection system comprises air contamination detectors, each detector 214 is generally placed a sufficient distance from an IPASD 216 to allow for activation of the IPASD 216 and a positive shutdown of all air flow before the contaminant in the system 200 reaches the IPASD 216. For example, the contaminant could include smoke. This "distance" between a detector 214 and IPASD 216 is generally a function of the velocity of the air moving through the system 200, and can vary from system to system. Thus, it may be necessary to determine a maximum velocity of air movement through the system 100 prior to locating each detector 214 relative to an IPASD 216.

Figure 3:
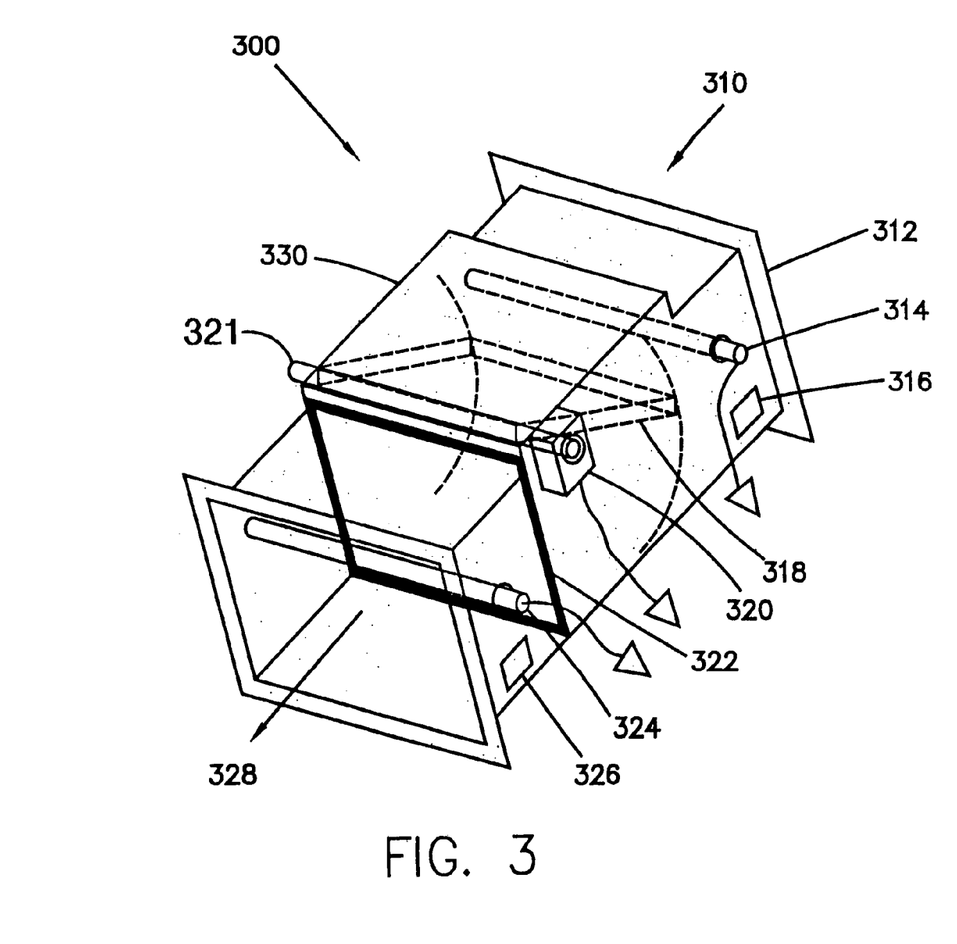
FIG. 3 is a perspective view of one embodiment of an air flow shutdown device incorporating features of the present invention.
Figure 3A:
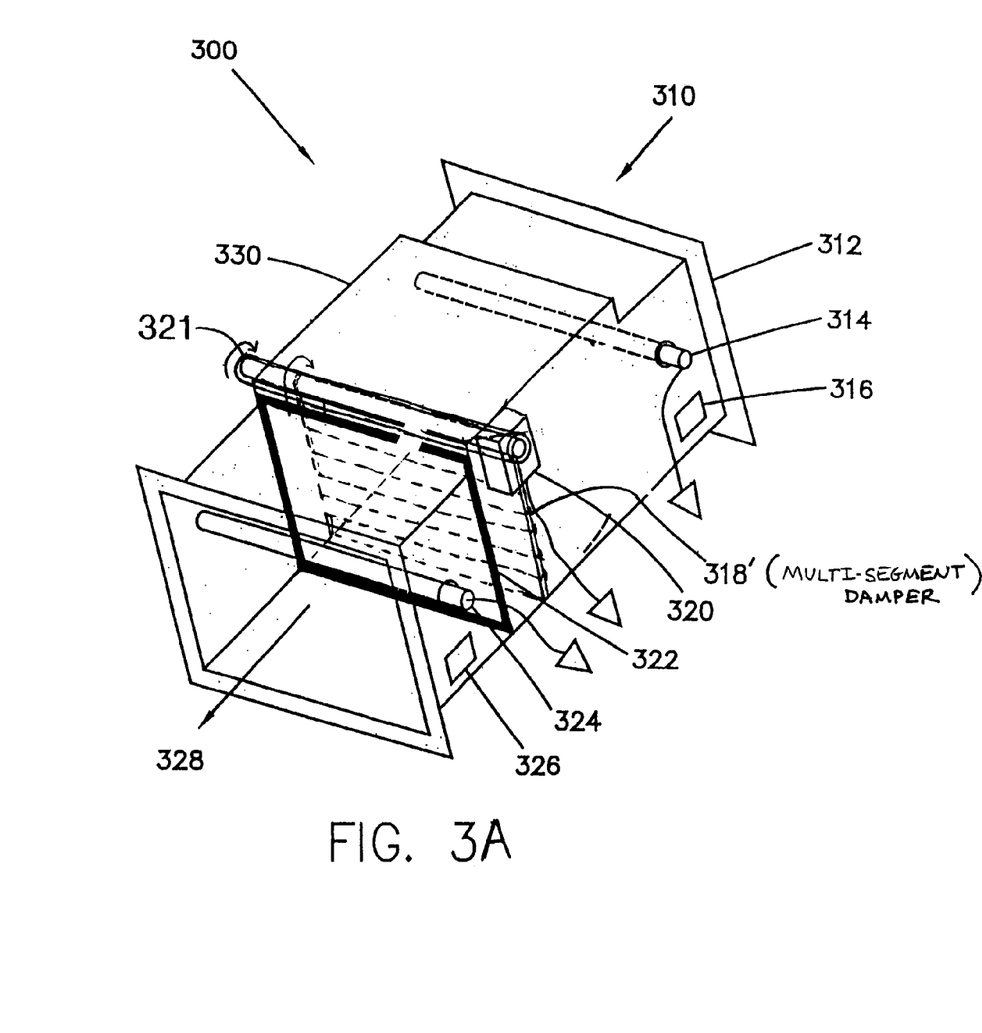

One embodiment of an IPASD 300 is shown in FIG. 3. The IPASD 300 is generally adapted to be coupled in line with an air passage or ventilation duct and includes a duct connection 312 to facilitate the connection of the IPASD 300 into the ventilation system. Although the IPASD 300 shown in FIG. 3 is of a square or rectangular geometric shape, it will be understood that any suitable, shape, size, width or length can be used. For example, in one embodiment, the IPASD 300 could have a circular cross-sectional area and shape.

Air enters the IPASD 300 via opening 310 and exits via opening 328. An air sampling tube 314 can be used to test the quality of the air in the IPASD 300. The tube 314 is generally adapted to allow the insertion of test instrumentation in the tube so that the air quality in the IPASD 300 can be tested without the release of the contained air in the IPASD 300 into an unsecured environment. The air sampling tube(s) 314 allow for testing the air in an IPASD 300 after it has been activated in order to define a point of contamination. The IPASD 300 could also include another air sampling tube to monitor the air flowing through the IPASD 300. In alternate embodiments, any suitable number of air sampling tubes 314, 324 can be used.

The IPASD 300 includes a damper 318 that is adapted to seal off the flow of air in the IPASD 300 when the damper 318 moves into the closed position. In one embodiment, the damper 318 mates with, or seats, against an air tight sealing gasket 322 when the damper 318 closes. When the damper 318 is in this closed position, air cannot flow past the damper 318 and through the IPASD 300. A rotating arm 321 can be used to connect the damper 318 to a surface of the air damper device 300 and rotate the damper 318 between the open and closed positions.

The actuator 320 also allows the air passage or IPASD 300 to be reopened either manually or automatically, when desired. For example, if the air in the system is determined to be free or substantially clear of any foreign agent so that ventilation can resume, the damper 318 can be automatically or manually positioned back to the open position, where it awaits the next close instruction.

As shown in FIG. 3, in the open position, the damper 318 is adapted to be positioned in a substantially horizontal orientation along an interior cavity surface of the IPASD 300. Although, the damper 318 is shown in a substantially horizontal orientation in the "open" position and a substantially vertical orientation in the "closed" position, any suitable orientation of the dampers 318 can be used. For example, in one embodiment, the damper 318 could be positioned along a side wall of the interior cavity of the IPASD 300 and open and close like a door. In another embodiment, the damper 318 could be adapted to roll up on itself in the open configuration and unroll in order to close off the passage and air flow. The damper 318 could be multi-segment damper and be adapted to roll "up", similar to a garage door, into an open position, and roll down to the closed position. Although the damper 318 is shown in FIG. 3 as comprising a single piece damper, the damper 318 could be formed from any number of individual pieces, that when positioned in the "closed" orientation, come together and form an air tight seal between each segment. A multi-piece damper 318 can include sealing gaskets between each segment or piece.

In order to allow the air to flow through the IPASD 300 in an undisturbed manner when the damper 318 is in the open configuration, in one embodiment the IPASD 300 includes a damper cavity 330. The damper cavity 330 is generally adapted to provide a recess adapted to receive the damper 318. When the damper 318 is received in the cavity 330, the interior walls of the IPASD 300 remain substantially flat or even, so as to not substantially disturb the air flow through the IPASD from end 310 to end 328.

Figure 4:
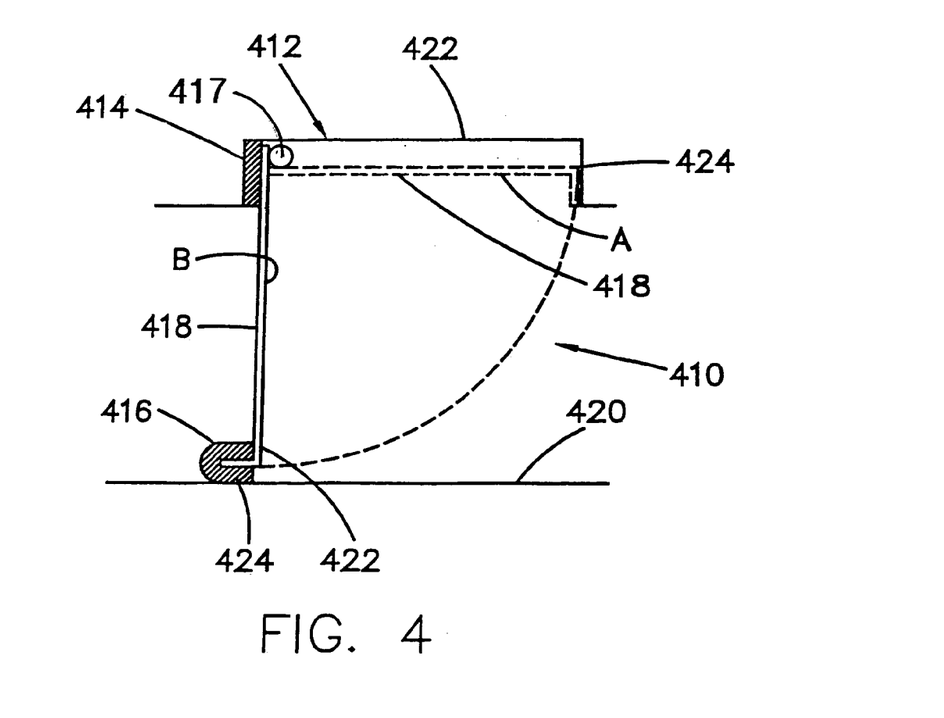
FIG. 4 is a partial side view of the closure device shown in FIG. 2.

A side view of one embodiment of the IPASD 300 of FIG. 3 is illustrated in FIG. 4. In the open position A, the damper 418 is positioned out of the main air flow stream and does not substantially interfere with the air flow 410. When the damper 418, coupled to the rotatable arm 417, moves from the open position A to the closed position B, the air passage or duct is sealed and air flow is stopped. A gasket 414 along the hinged end of the damper 418 provides an air tight seal. The gasket 414 could be affixed to the interior surface of the damper cavity 414. Another gasket 416 is used to seal the opposite side or edge of the damper 418 with the interior 420 of the IPASD 300. The gasket 416 can either be mounted to the corresponding edge of the damper 418 or affixed to the interior surface 420. When the damper 418 shuts or closes, the end 422 of the damper 418 seals against the gasket 416.

In one embodiment, as shown in FIG. 4, the damper 418 includes an edge or member 424 that extends at an approximately 90° angle from the member 422 of the damper 418. Although an angle of approximately 90° is shown, any suitable angle can be used. This member, or lip 424, can be received in a corresponding recess or opening in the gasket 416. In alternate embodiments, any suitable means can be used to cause the damper to form an air tight seal with the interior surfaces of the IPASD 300. It is a feature of the present invention to stop the flow of air through the IPASD 300 when the damper 418 closes.

As shown in FIG. 3, in one embodiment, the IPASD 300 can also include a sight glass or opening 316 to provide for visual inspection of the interior cavity of the IPASD 300. The embodiment of FIG. 3 includes both an entering sight glass 316 and an exiting sight glass 326, although any suitable number of sight glasses can be used, if any.

Referring to FIG. 2, the system 200 also includes a controller 222. The controller 222 is generally adapted to receive inputs from several sources and control the operation of the IPASD 216 as well as the other components of the system 200. As shown in FIG. 2, the controller 222 is electrically coupled or connected to the central HVAC system 212, the activator/detector(s) 214, the IPASD(s) 216 and the over pressurization system 220. The controller 222 can also be coupled to a manual activation device 224 outside of the immediate air system. In alternate embodiments, the controller 222 can be connected to any suitable component or device in the system 200. It is a feature of the present invention to react to the presence, or potential presence, of a foreign agent in the system 200 and substantially simultaneously activate IPASD(s) 216, while also shutting down other HVAC components in the system.

In one embodiment the controller 222 is adapted to receive electrical signal inputs from the activator/detector(s) 214 and issue start/stop and IPASD deployment commands in a coordinated manner to all system components and devices that will completely shutdown and substantially stop all air movement in and through the air distribution system 200.

For example, in one embodiment, when the activator/detector 214 is activated an electrical signal or impulse is transmitted to the controller 222. The controller 222 receives the detection signal and can immediately activate one or more IPASD(s) 216. At substantially the same time, the controller 222 can also cause a shutdown of the various air distribution system components that facilitate air movement through the system. These can include fans, intake units and other damper activators, for example. The controller 222 could also activate an alarm and/or notify emergency personnel.

The controller 222 can be integrated into the system 200 and can form a part of a control system or panel for the HVAC system or a security system that monitors the HVAC system.

Figure 5A:
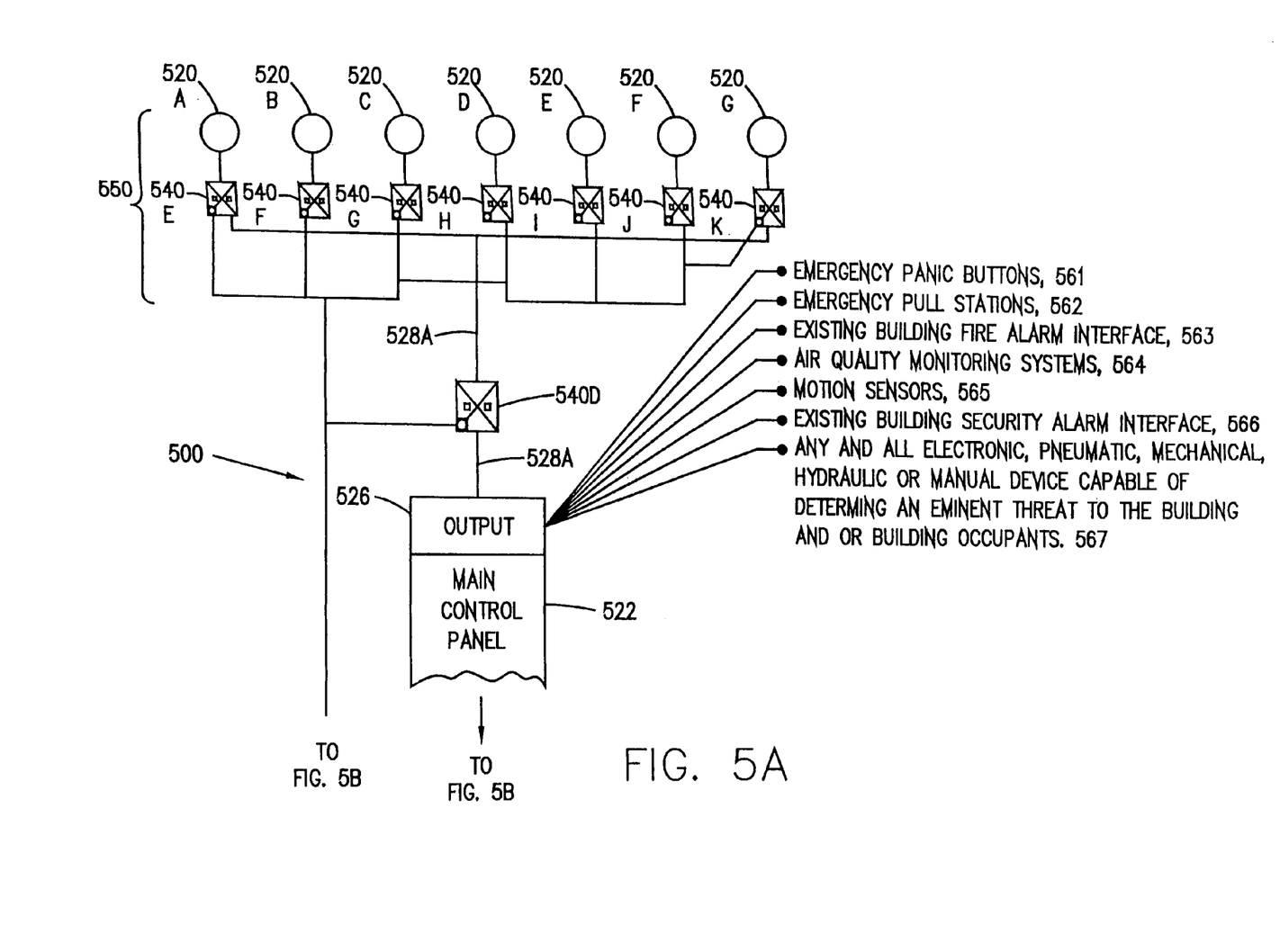
FIG. 5 is a schematic diagram of system incorporating features of the present invention implemented in a conventional HVAC system.
Figure 5B:
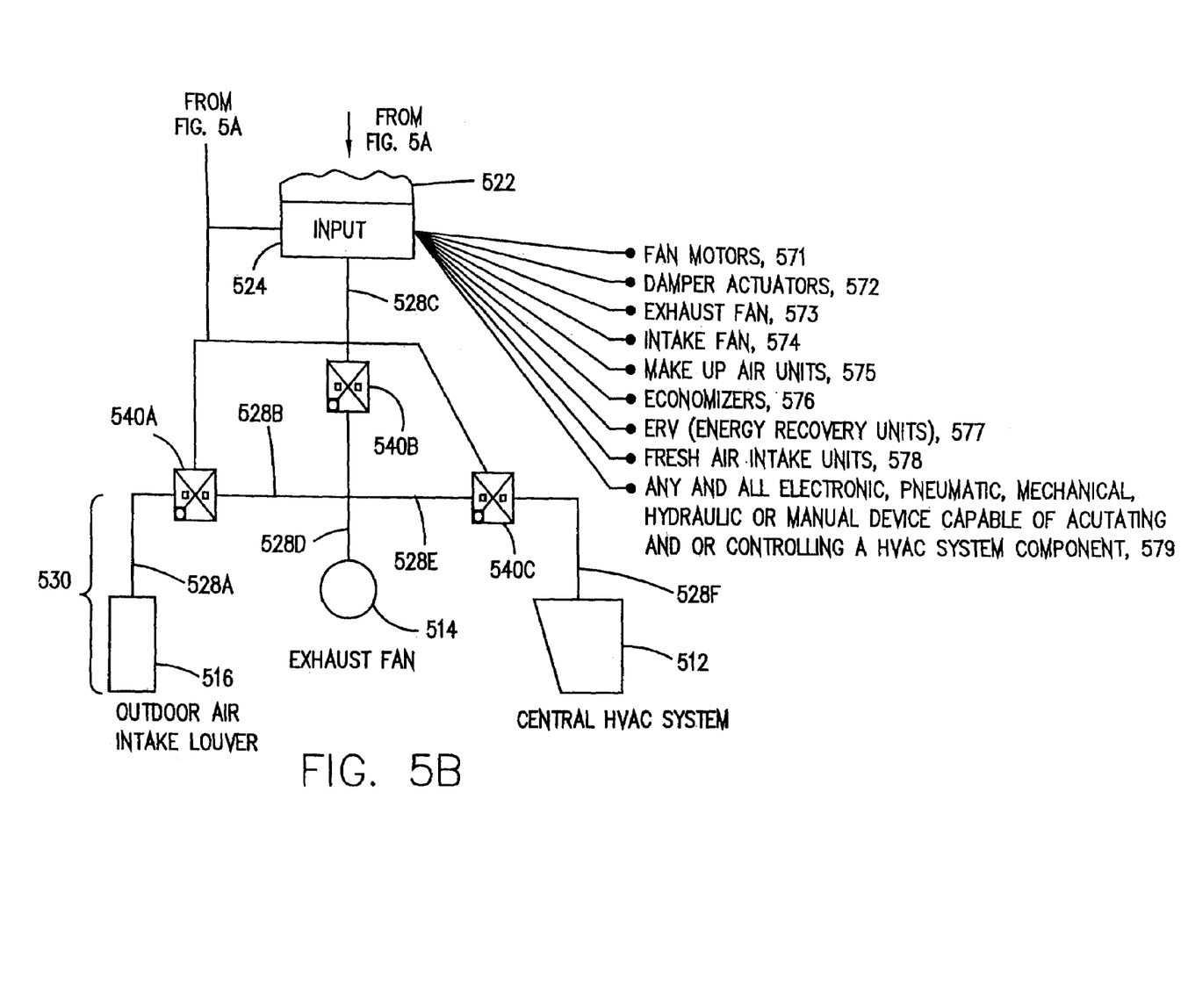

Referring to FIGS. 5a and 5b, a schematic diagram of a facility air distribution system 500 incorporating features of the present invention is shown. In alternate embodiments, the system 500 can also include such other suitable components for blocking and stopping the movement of air in an air duct system. It is a feature of the present invention to substantially instantaneously shutdown, and stop the air movement in the air distribution system.

As shown in FIGS. 5a and 5b, the system 500 generally comprises an input section 530 and an output section 550. The input section 530 generally includes devices such as an outdoor air intake louver 516, exhaust fan 514 and a central HVAC system 512. The output section 550 generally includes the air delivery point(s) or distribution area(s) 520a–520g where the ventilation is supplied. The controller 522 in FIGS. 5a and 5b includes a main control panel input 524 and a main control panel output 526. The controller 522 can be electronically connected to each of these sections 530, 550, as well as to each of the individual devices and components within each section 530, 550, if desired.

As shown in FIGS. 5a and 5b, fresh air is generally drawn into the system 500 via the outdoor air intake louver 516. The air travels through the ductwork 528 of the system to the central HVAC system 512 and to the air distribution areas 520a–520g. Air can be outputted from the system 500 via the exhaust fan 514. In alternate embodiments, the system 500 can include any suitable device or system to facilitate air movement in an air distribution system, including electronic, pneumatic, mechanical, hydraulic or manual device capable of activating and/or controlling a HVAC system component.

Referring to FIGS. 5a and 5b, in one embodiment the main control panel input section 524 is adapted to receive inputs from devices in the system 500. These devices can include for example, emergency panic buttons 561, emergency pull stations 562, existing building fire alarm 563, air quality monitoring systems 564, motion sensors 565, existing building security alarm interface 566, and any and all electronic, pneumatic, mechanical, hydraulic or manual device(s), or any combination(s) thereof, capable of determining an eminent threat to the building and or building occupants 567. Each of the input devices referred to above can generally be referred to as an IPASD activation device. In alternate embodiments, any suitable device or means can be used as an IPASD activation device. The input(s) to the main control panel input 524 are generally adapted to alert the facility 500 and its occupants of a threat or danger to the air distribution system.

The main control panel output 524 shown in FIGS. 5a and 5b is generally adapted to issue an output signal to one or more of the air system components that make up the facility air distribution system 500. These components can include for example, fan motors 571, damper actuators 572, exhaust fan(s) 573, intake fan(s) 574, make up air units 575, economizers 576, ERU (energy recovery units) 577, fresh air intake units 578, and any and all electronic, pneumatic, mechanical, hydraulic or manual device(s) or combination(s) thereof, capable of actuating and or controlling the HVAC system components 579. The output signal will command each unit to stop function in order to stop the migration of air in the system.

In one embodiment, the main control panel 522 is adapted to receive and process an IPASD activation signal. The detection signal can be in any suitable format or signal type and can be provided by any type of sensing or activation means. For example, manually activated switches or pull stations could be located throughout a building or facility. When activated, the switch sends a signal to the main control panel 522 where the signal is processed, and an appropriate action is taken, such as for example, activating an IPASD associated with a specific area, or activating one or more IPASD units. The main control panel could also be adapted to activate audible and visual alarms, and notify an appropriate response agency. Generally, the main control panel 522 is adapted to issue signals to and control the various systems and devices in the air distribution system.

Figure 6:
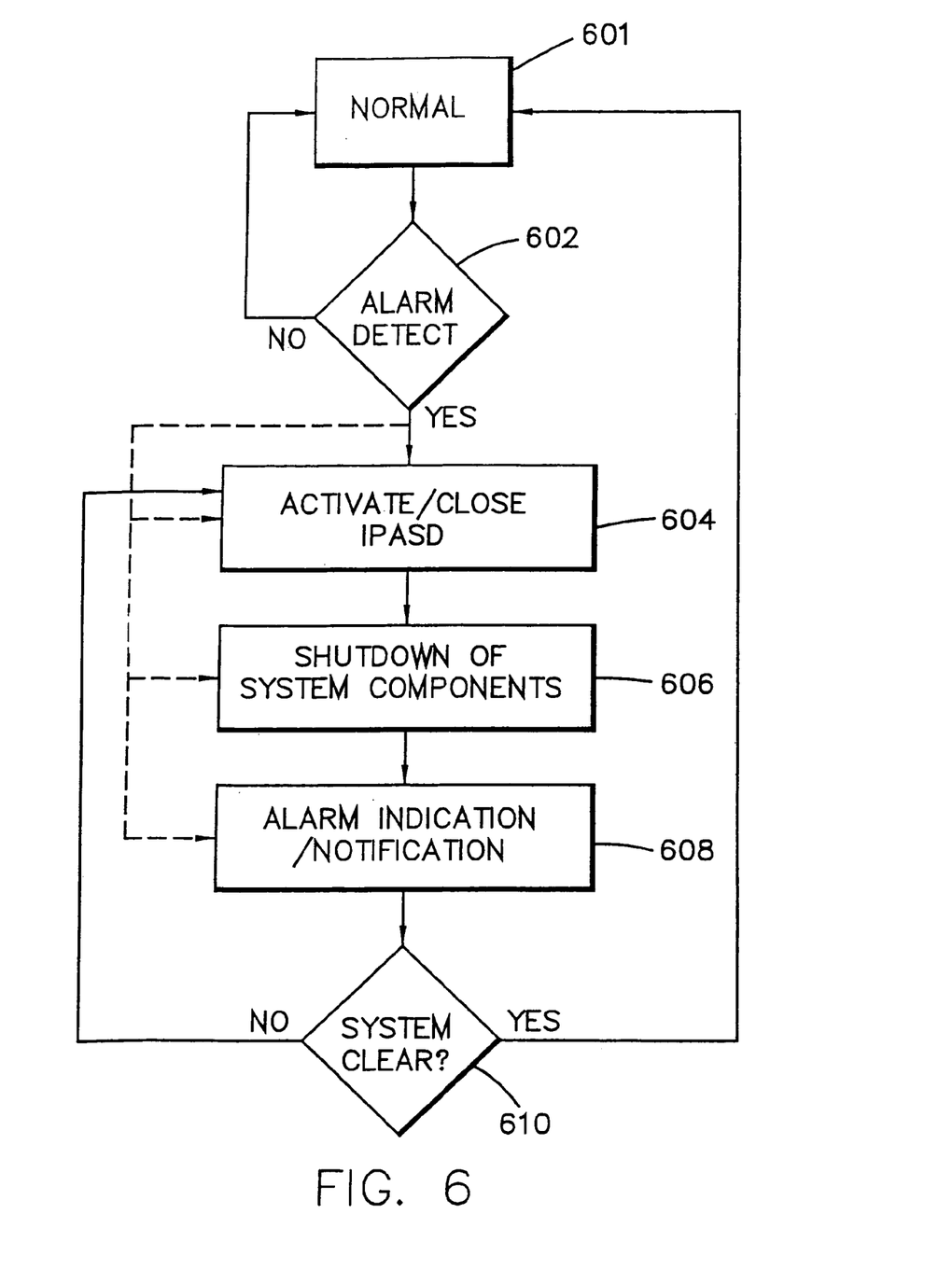
FIG. 6 is a flowchart illustrating one embodiment of a method incorporating features of the present invention.

Referring to FIG. 6, a flowchart of one embodiment of a method incorporating features of the present invention is illustrated. During normal operation, step 601, it is determined whether or not a foreign agent or contaminant is detected or a manual alarm has been activated, step 602. If not, the system 200 shown in FIG. 2 maintains normal operations. If a foreign agent is detected, at least one IPASD 216 is activated 604. Generally, an IPASD 216 located immediately downstream from a possible contamination area will be the first to be activated or closed. However, other IPASD(s) 216 in the system 200, upstream or downstream, from the possible contamination area could be caused to close as well. The term "activating" as used herein means to close the IPASD 216 so as to stop the flow of air. Closure could occur by the application of a signal to the IPASD 216 of the removal of a signal that allows the IPASD 216 to close.

After, or simultaneously with the activation of the IPASD 216 in step 602, other air handling devices or HVAC system components are caused to shutdown, step 606. The shutdown of the various HVAC system components, some of which are illustrated in FIGS. 5a and 5b, is generally adapted to stop the forced movement and migration of air throughout the system 200 and into the distribution areas. The continued movement of air is absorbed into the over pressurization system.

Also occurring substantially simultaneously with the activation of the IPASD in step 602 is the activation of appropriate alarms in step 608. This could include audible and visual alarms to notify occupants of the facility of the threat, as well as providing notification to emergency response agencies.

After the system has been cleared, or the threat removed, step 620, the system can resume normal operations, step 601. As long as the threat remains, the IPASD(s) 604 can remain closed, step 604.

Figure 7A:
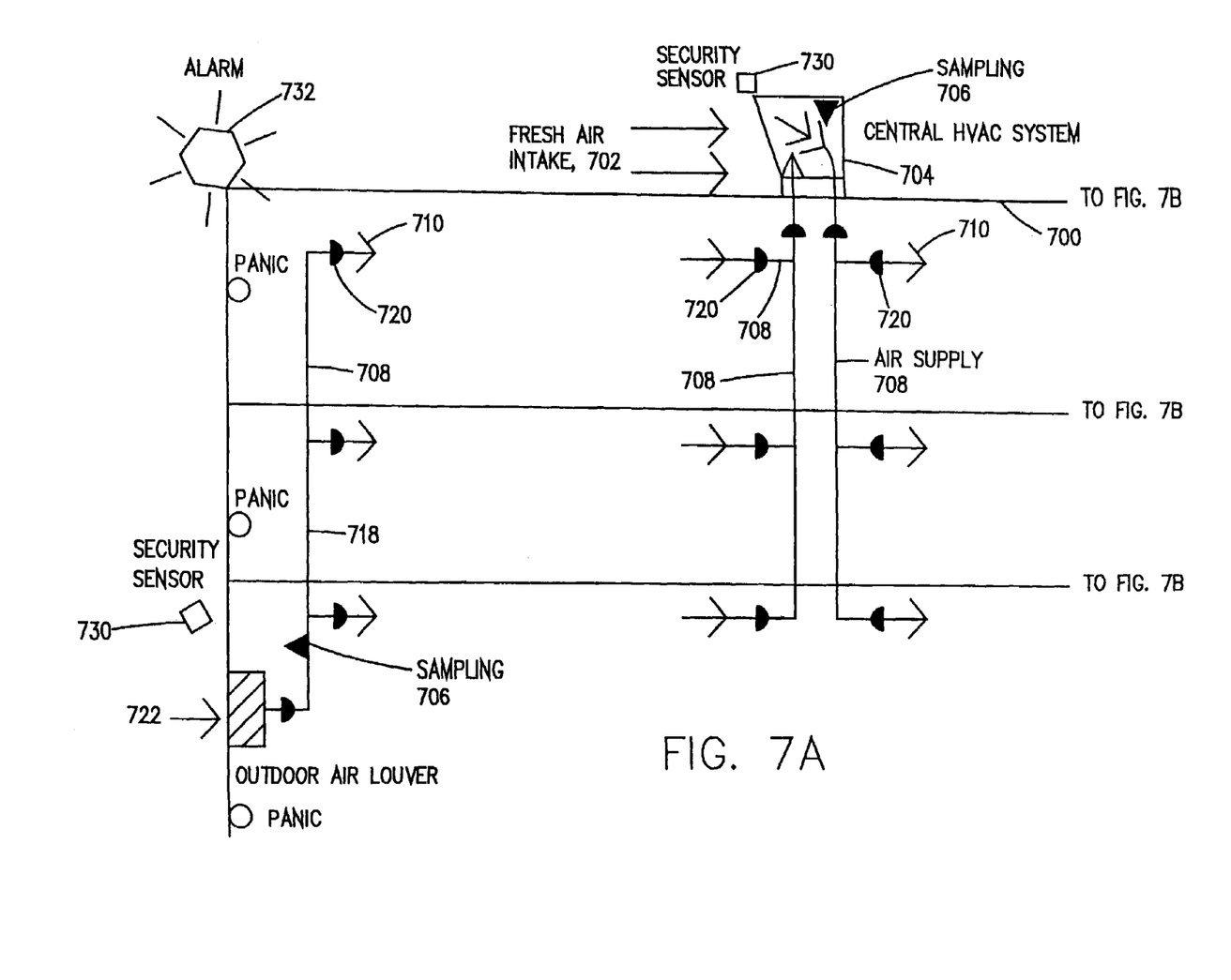
FIG. 7 is a schematic diagram of another embodiment of a system incorporating features of the present invention.
Figure 7B:
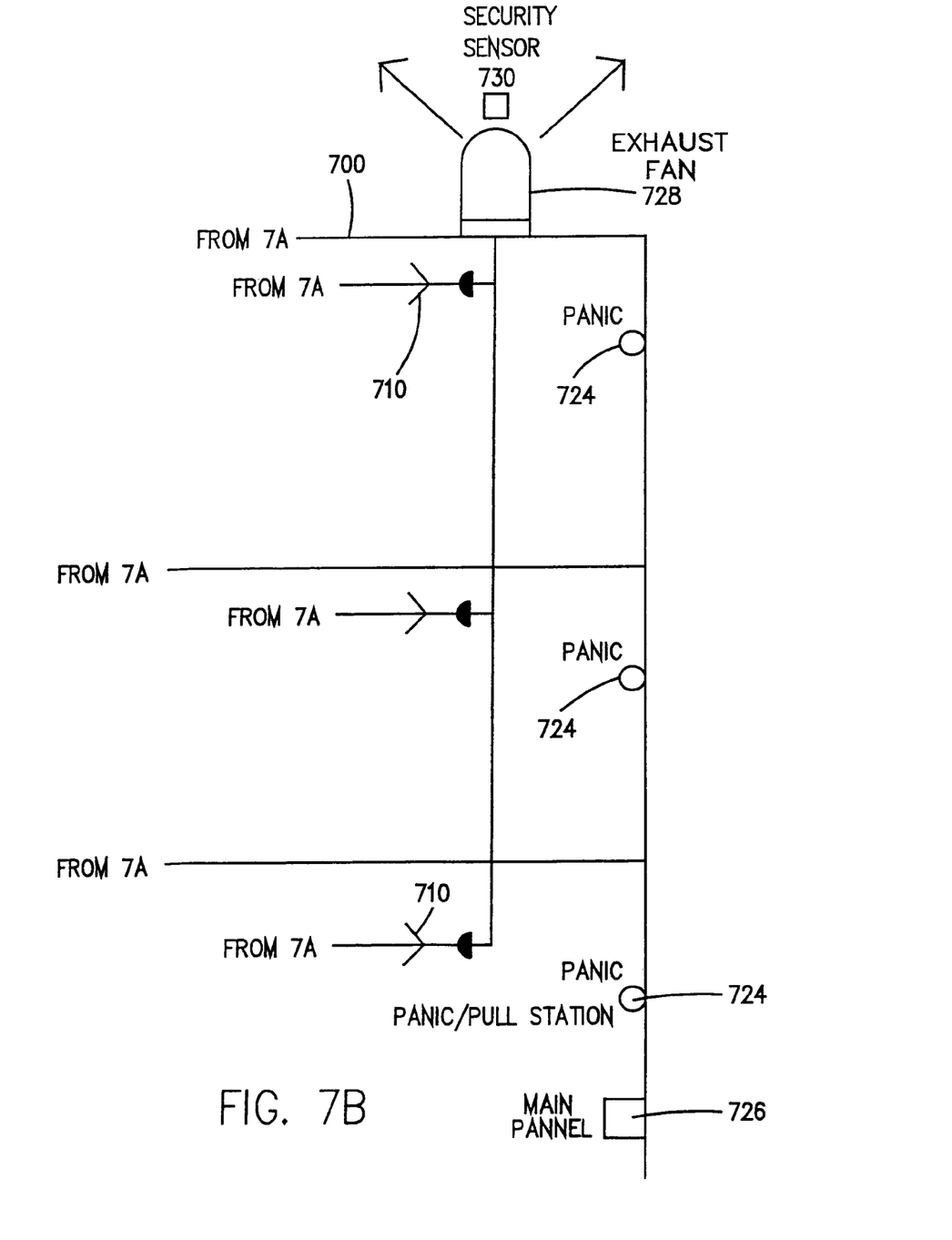

FIGS. 7a and 7b illustrate a schematic diagram of an airlock system incorporating features of the present invention implemented in a standard building HVAC system. The building HVAC system 700 includes a fresh air intake 702 that delivers air into the central HVAC system 704. Sampling of the air can occur via a sampling device 706, which can include a contaminant or foreign agent detector. Air is distributed throughout the system 700 via the air supply 708, which can generally comprise a network of ducts. The distribution area 710 can include any suitable number of areas. An IPASD 720 is generally incorporated in each air supply line 708. Another air sampling device is associated with the air supply line 718 leading to the outdoor air louver.

The system 700 also includes one or more panic/pull stations 724 that can be manually activated. A security sensor 730 can be used to detect any tampering with or intrusion into the system 700. For example, as shown in FIGS. 7a and 7b, the security sensor 730 is positioned near or with the exhaust fan 728 and outdoor air louver 730. An alarm 732 can be used to provide an audible or visual warning. The system status and other indications can be displayed on the main panel 726. The main panel 726 could also include an indication of the status of each detector 706 and IPASD device 720 in the system.

Embodiments of the present invention generally provide an integrated system to protect a facility air management system from the intentional or unintentional exposure to harmful chemical or biological agents. The present invention provides a system that can provide an immediate and positive shutdown of the system airflow, in an HVAC system for example, in the event of threat to the air distribution system closure device of the present invention provides a secure means to substantially instantaneously seal a ventilation duct. The system can also stop all other devices responsible for moving air through the system and provide warnings or alarms to occupant and other personnel.

By integrating the control system, activation/detection system and mechanical system components of the present invention, an integrated system is provided that can react to a potential threat to a facility air distribution system. With all air movement and or migration stopped the present invention will greatly reduce if not eliminate the chance of exposure to harmful chemical and or biological agents while the occupants are in the process of evacuating the building.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An air duct closure device to prevent a flow of air and foreign agents, comprising:
    a normally open air damper device including an inlet and an outlet, the air damper device being connected in-line in a respective portion of a duct in an air duct system;
    a rotatable sealing damper in the normally open air damper device, the sealing damper rotating from a normally open position to a closed position when the air duct closure device is activated and seal off, when the sealing damper in the normally open air damper device is in the closed position the air duct closure device and prevent air and foreign agents from flowing through the normally open air damper device and the air duct system;
    a normally closed air damper device including an inlet and an outlet, the air damper device being connected in parallel across a respective portion of the duct in the air duct system; and
    an over pressurization control device connected to the normally closed air damper.

2. The device of claim 1 further comprising at least one air sampling device in the air damper device, the air sampling device configured to detect the presence of the airborne contaminant for secure testing of air contained in a secured air damper device in the air duct system.

3. The device of claim 2 wherein the at least one sampling device includes a downstream air sampling device and an upstream air sampling device in the air damper device.

4. The device of claim 1 further comprising a spring close motor actuator configured to hold the sealing damper in an open position and then upon activation, cause the sealing damper to seal the air damper device.

5. The device of claim 1 wherein the sealing damper further comprises a sealing gasket in the air damper device, the sealing gasket sealing the air damper device from further air flow through the air damper device when the sealing damper is moved into the closed position.

6. The device of claim 5 wherein the sealing gasket further includes a channel along at least one edge into which at least one corresponding edge of the sealing damper is received when the sealing device is in the closed position.

7. The device of claim 1 wherein the sealing damper is configured to move in a direction of air flow in the air damper device to seal the air damper device from air flow through the air damper device.

8. The device of claim 1 further comprising a rotatable arm connecting the sealing damper to a surface of the air damper device, the rotatable arm being configured to move the sealing damper between an open and closed position.

9. The device of claim 1 further comprising at least one sight glass in a surface of the air damper device, the sight glass configured to allow viewing of an interior of the air damper device.

10. The device of claim 9 wherein the at least one sight glass comprises a first sight glass in an upstream portion of the air damper device and a second sight glass in a downstream portion of the air damper device.

11. The device of claim 1 further comprising a recess along an interior surface of the air damper device into which the sealing damper is received when the sealing device is in an open position.

12. The device of claim 1 further comprising a rotatable arm configured to rotate the sealing device from a open position to the closed position to cut off air flow through the air damper chamber.

13. The device of claim 12 wherein the rotatable arm is motor driven.

14. The device of claim 1 further comprising an over pressurization control device configured to bypass airflow remaining in the air duct system after the sealing device moves from the open to the closed position.

15. The air duct closure device of claim 1 wherein the sealing device is a resetable sealing device that can be moved from the open position to the closed position and back to the open position upon manual command in a test mode.

16. The air duct closure device of claim 1 wherein the sealing device further comprises a single blade that is non-perforated, a horizontal side of the blade being coupled to a shaft on which the blade pivots and rotates to move the blade from the open to closed position, the shaft being mounted on an interior portion of the air damper device out of the air flow.

17. The air duct closure device of claim 1 wherein the sealing device further comprises a multi-segmented damper, with sealing gaskets between each segment.

18. The air duct closure device of claim 1 wherein the sealing damper further comprises an edge member extending at an angle from a face of the sealing damper that is received in a correspondingly angled gasket when the sealing damper is closed.

19. An air flow shutdown system comprising:
an air distribution system;
at least one normally open air duct closure device in the system, the at least one air duct closure device comprising a rotatable damper and a corresponding gasket against which the rotatable damper seals when in a closed position, the normally open air duct closure device configured to move into a closed position in a single motion and substantially instantaneously seal off and block air flow and prevent a migration of at least one foreign agent in the air distribution system when activated and closed;
at least one normally closed air duct closure device in the system, the normally closed air duct closure device configured to move into an open position upon the sealing off and blockage of air flow by the normally open air duct device;
at least one over pressurization control device connected to the at least one normally closed air duct closure device; and
an integrated control system coupled to the air distribution system and configured to activate the normally open air duct closure device and the normally closed air duct closure device and stop an operation of at least one other air distribution device in the air distribution system in order to prevent migration of air and foreign agents through the system.

20. The system of claim 19, wherein the integrated control system is configured to close an air duct closure device upstream from a point of the contaminant and downstream from a point of the contaminant.

21. The system of claim 19 further comprising at least one air sampling port in the air distribution system, the sampling port configured to allow the air in an activated air duct closure device to be tested without releasing trapped air into a surrounding environment.

22. The system of claim 19 further comprising a manual switch configured to provide a detection signal to the control system and activate the closure of the at least one closure device and deactivate the at least one closure device to return the at least one closure device to a normally open position.

23. The system of claim 19 wherein the control system further comprises a notification device configured to activate an alarm upon activation of the closure device.

24. The system of claim 19 wherein the normally open air duct closure device further comprises:
an airflow shutdown chamber configured to be coupled in-line in a duct line;
a sealing damper in an interior of the chamber, the damper rotatably coupled in the interior of the chamber, wherein when the damper is in an open position, a flow of air through the chamber is not impeded and when the damper is in a closed position, the flow of air through the chamber is substantially completely obstructed; and
a motor operated spring close actuator for moving the sealing damper between the open and the closed position, the spring close actuator holding the sealing damper in a normally open position when electrical power is applied to the spring close actuator.

25. The system of claim 24 further comprising a sealing gasket positioned circumferentially around an interior surface of the chamber, the damper configured to engage the sealing gasket when the damper is in the closed position in order to obstruct air flow through the chamber.

26. The system of claim 24 wherein the power open spring close motor actuator is configured to move the damper in a direction of the airflow to close the damper.

27. The system of claim 19 wherein the control system is further configured to issue a stop command to all air movement devices in the air distribution system upon activation of the air duct closure device wherein the air movement devices are deactivated.

28. The airflow shutdown system of claim 19 wherein the over pressurization control device is configured to bypass airflow remaining in the air distribution system when the at least one air duct closure device is activated to block airflow.

29. The airflow shutdown system of claim 28 wherein the at least one normally closed air duct closure device, upon activation of the at least one air duct closure device, the at least one normally closed air duct closure device opens and allows air flow to move through the at least one normally closed air duct closure device.

30. The airflow shutdown system of claim 29 further comprising the at least one normally closed air duct closure device being connected in parallel to at least one air movement device in the air distribution system, wherein upon activation of the at least one air closure device, the at least one normally closed air duct closure device opens and allows air flow to move through the at least one normally closed air closure device and the at least one air movement device until air flow substantially ceases.

31. A method for providing a positive shutdown of air flow in an air distribution system comprising:
detecting a contaminant in the system;
activating at least one normally open duct closure device located upstream and downstream from a location of the detected contaminant, the at least one normally open duct closure device adapted to substantially instantaneously seal a respective air flow passage from further air flow by moving a rotatable damper in the air flow passage from an open to a closed position and seating the damper against an air tight sealing gasket to close off the air flow passage from further air flow through the air flow passage;
disabling all air flow control devices in the system to stop further migration of air flow in the system;
diverting air flow in the air distribution system after the air flow passage is closed off into a over pressurization control device by activating at least one normally closed air duct closure device connected in parallel across at least one closed section of the air distribution system; and activating an alarm system to notify occupants of a facility served by the air distribution system of the activation of the at least one sealing device.

32. The method of claim 31 further comprising the step of activating the at least one duct closure device by manual activation of an alarm notification device and resetting the at least one duct closure device to a normally open position upon activation of a reset device.

33. The method of claim 31 wherein the step of detecting comprises detecting, via at least one air sampling device in the air distribution system, a presence of the contaminant.

* * * * *